Oct. 22, 1974 D. L. ROWLAND 3,843,477
ARCUATE WIRE ASSEMBLY COATED WITH PLASTIC
Original Filed March 22, 1971 7 Sheets-Sheet 6

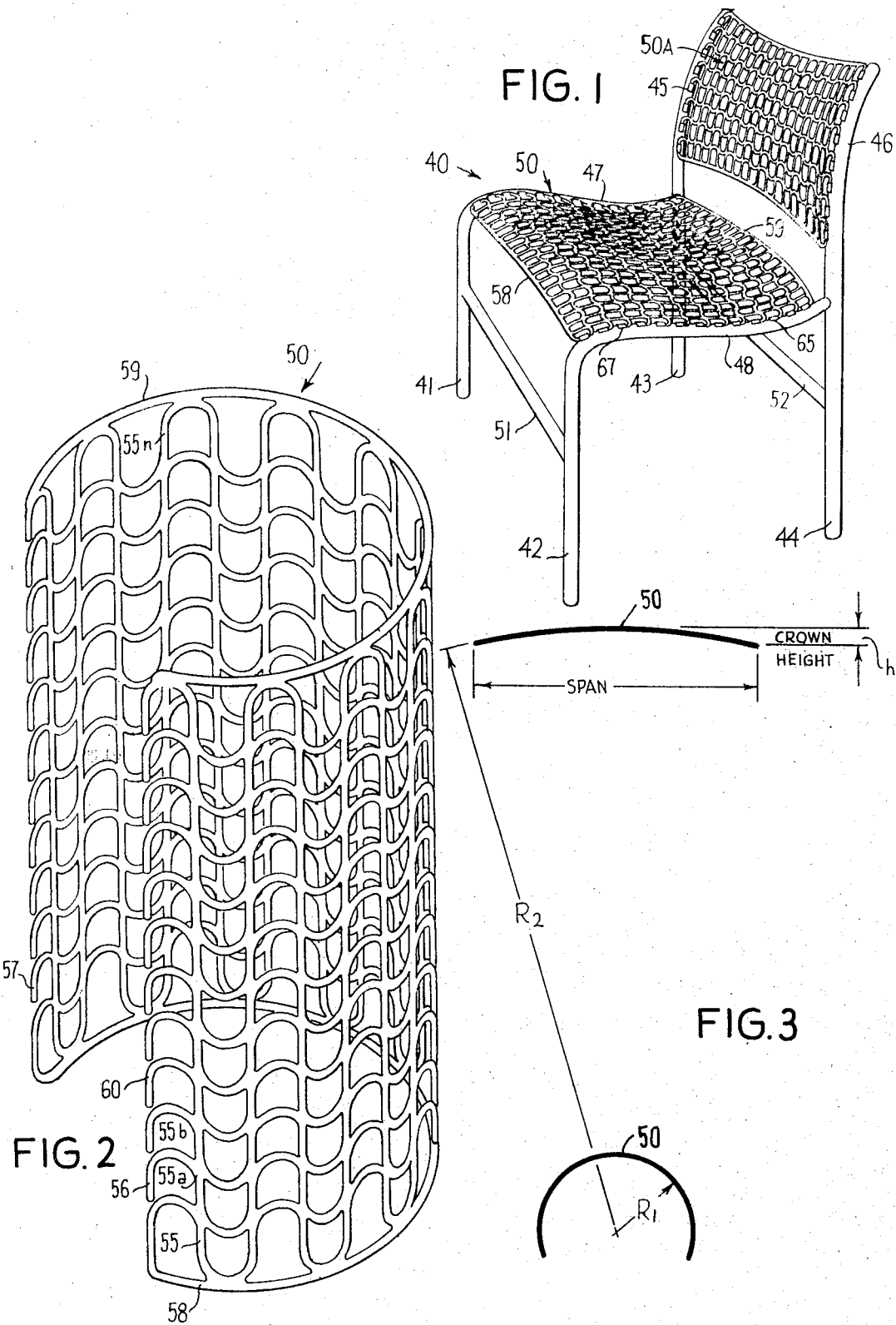

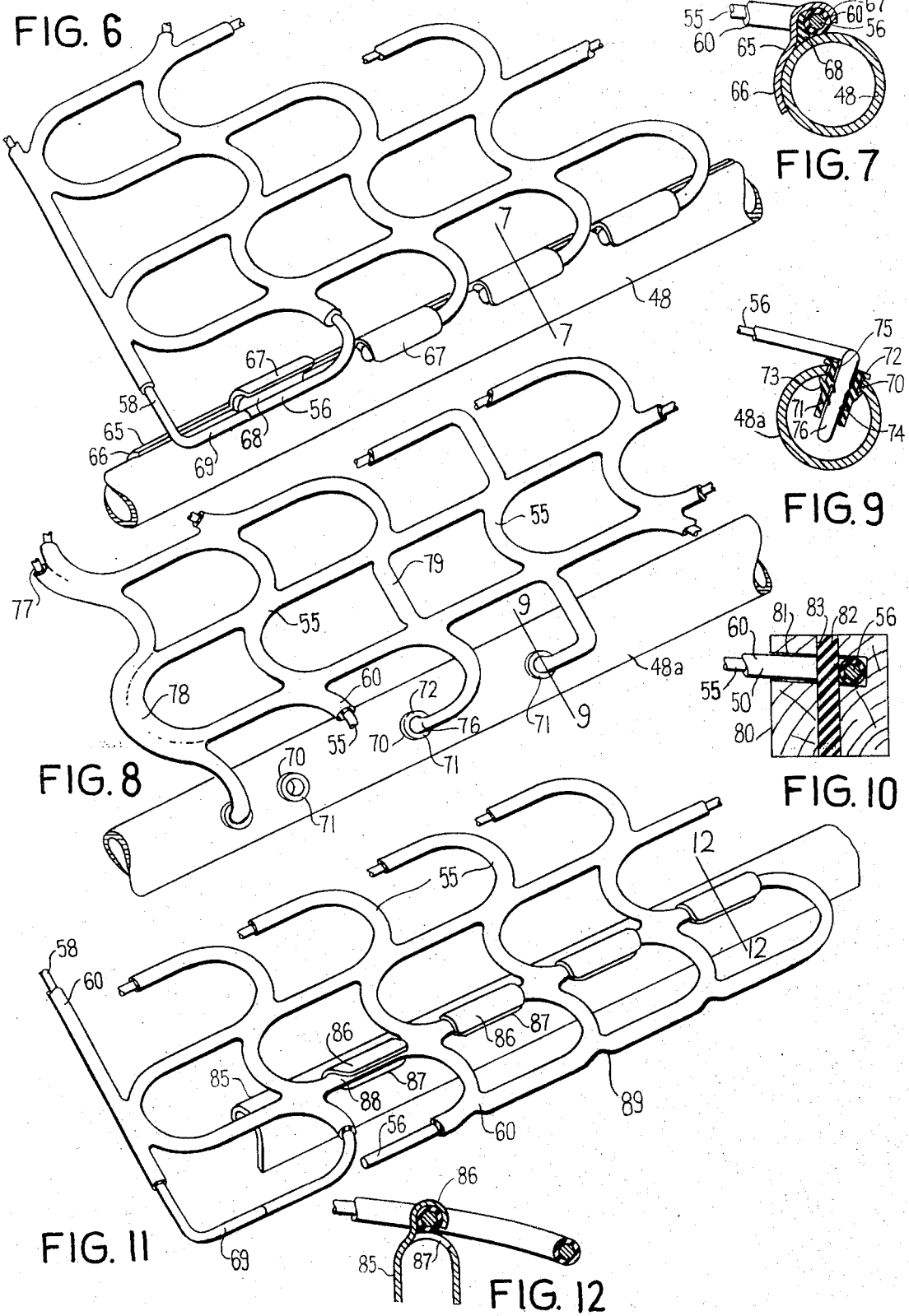

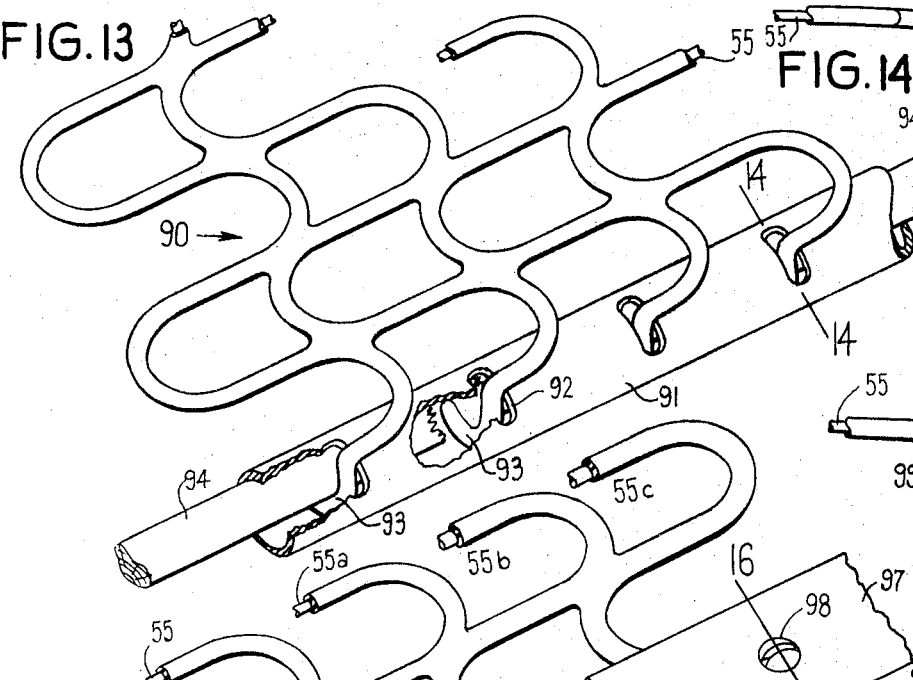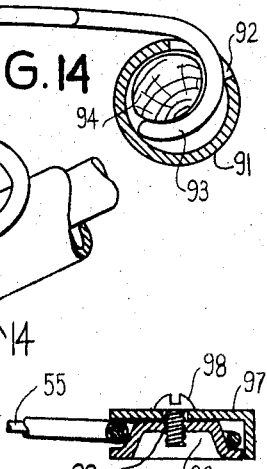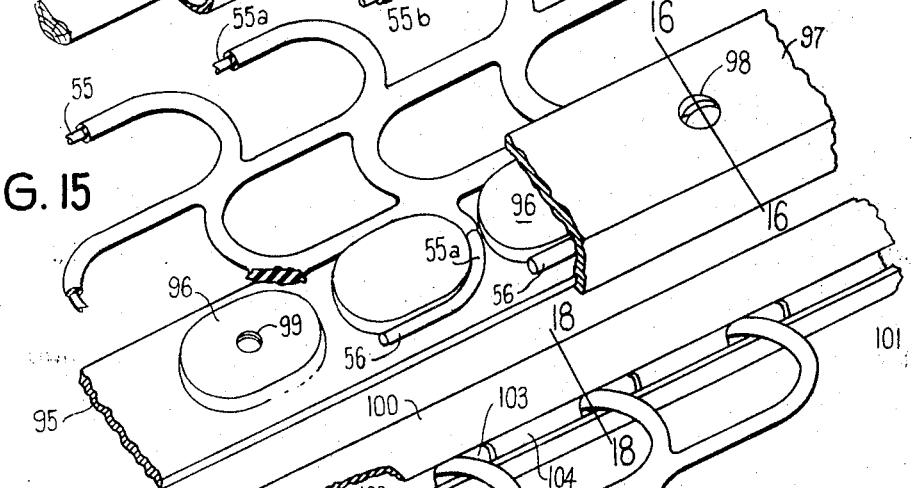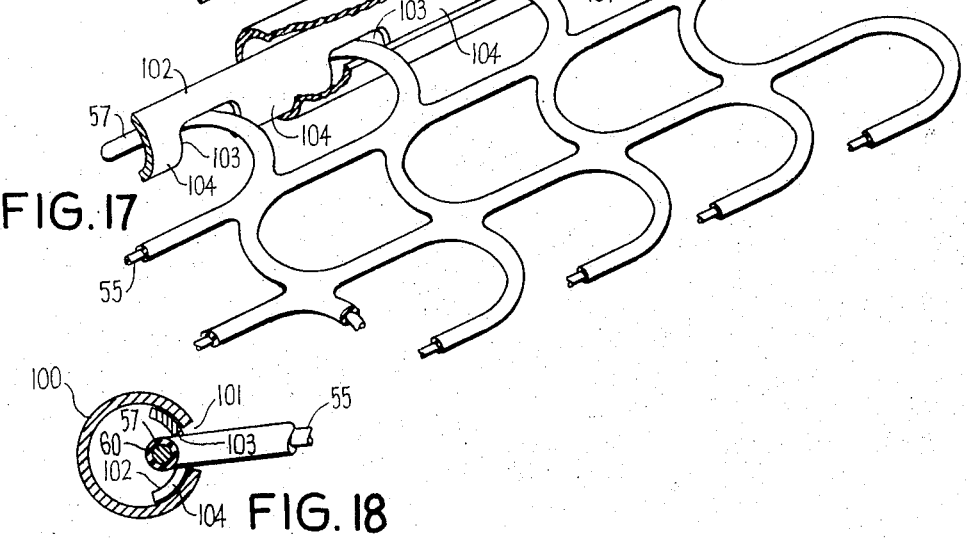

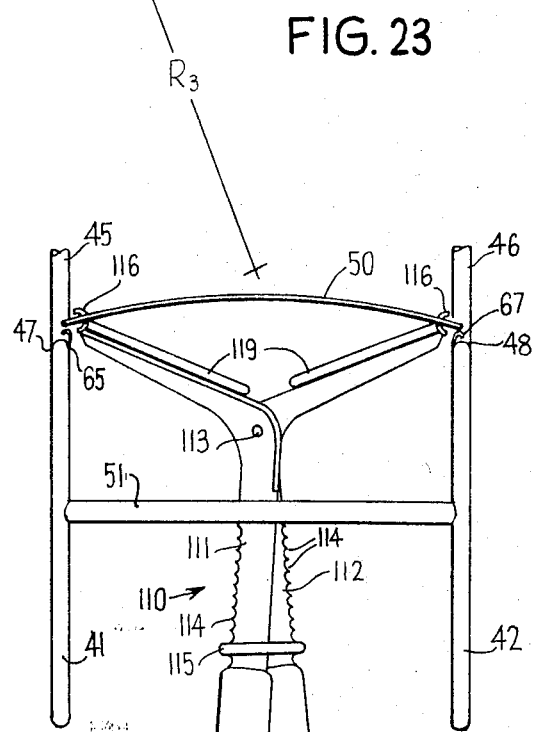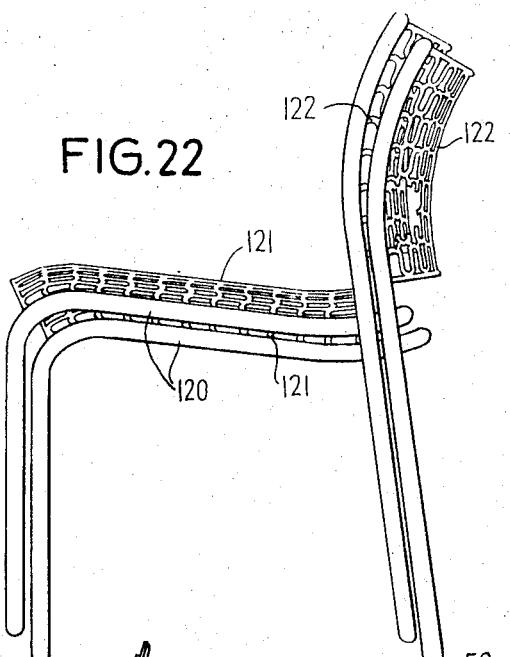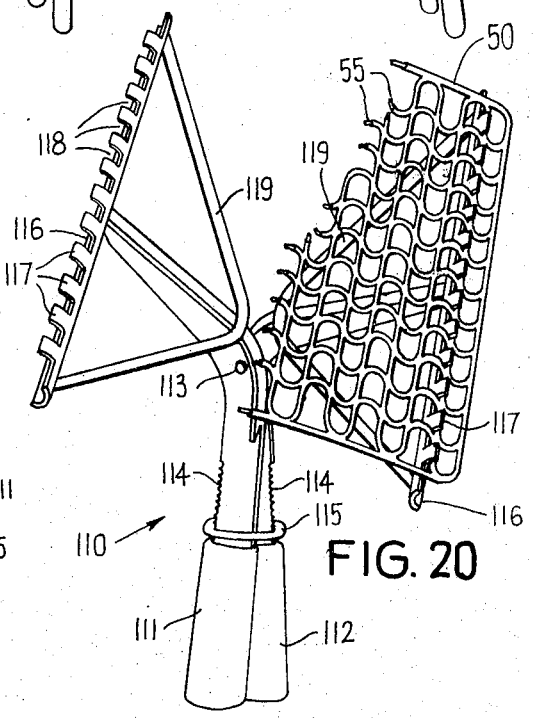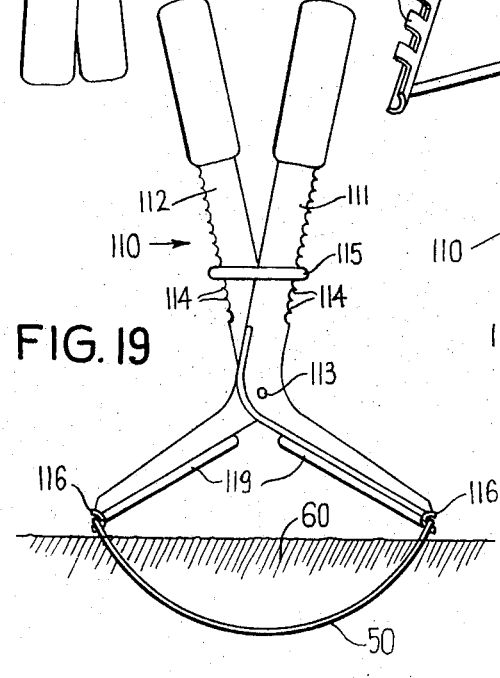

Oct. 22, 1974  D. L. ROWLAND  3,843,477
ARCUATE WIRE ASSEMBLY COATED WITH PLASTIC
Original Filed March 22, 1971  7 Sheets-Sheet 7
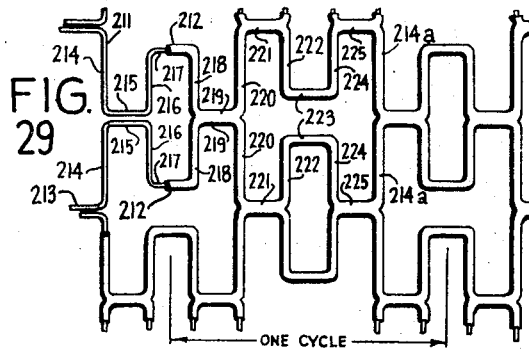
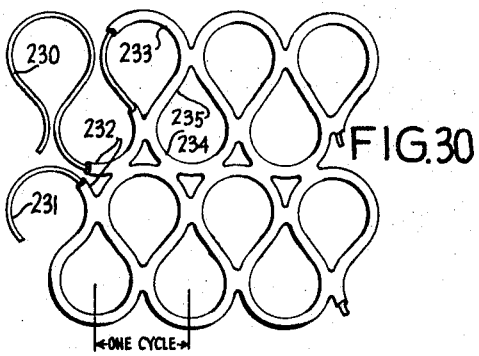
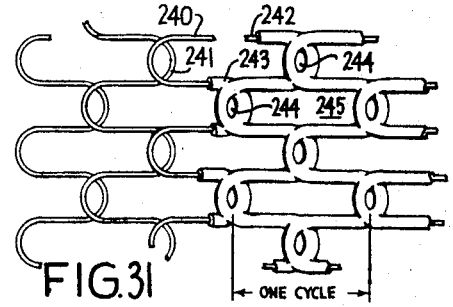
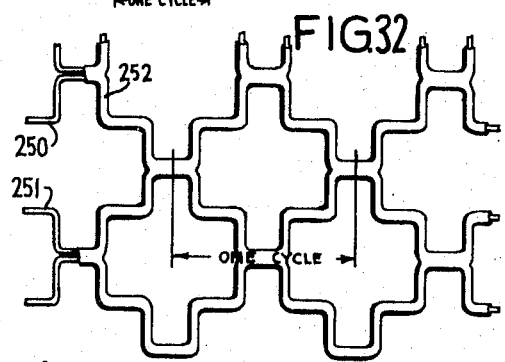
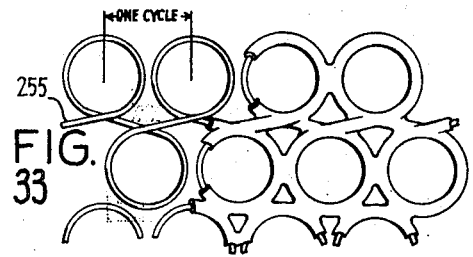
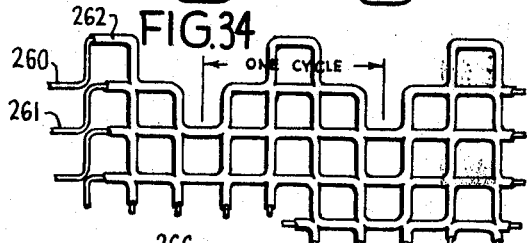
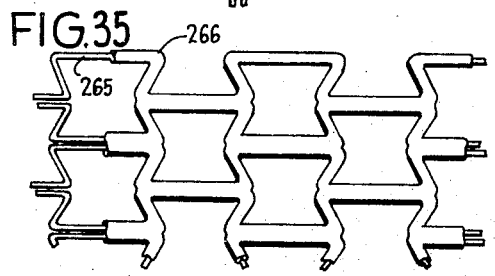
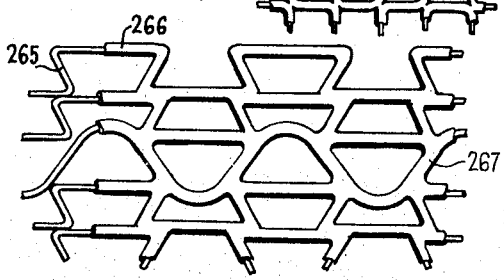
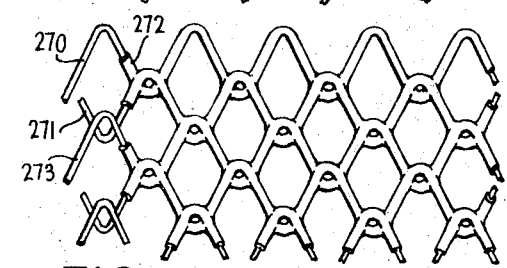

United States Patent Office 3,843,477
Patented Oct. 22, 1974

3,843,477
ARCUATE WIRE ASSEMBLY COATED
WITH PLASTIC
David L. Rowland, 49 W. 55th St.,
New York, N.Y. 10019
Original application Mar. 22, 1971, Ser. No. 126,563, now Patent No. 3,767,261. Divided and this application July 3, 1972 Ser. No. 268,907
Int. Cl. B32b 1/00
U.S. Cl. 161—125      17 Claims

ABSTRACT OF THE DISCLOSURE

Seats and backs for chairs and other seating units are made as a sub-assembly of sinuous spring wires. Each wire touches its adjacent wire at least once per cycle, and each of the wires extends when in the sub-assembly and before placed therein as a cylindrical arc, so that the assembly itself is a cylindrical arc. A thin sleeve-like plastic coating surrounds the wires and follows their sinuous shapes, linking the wires together wherever they touch or closely approach each other, to provide the unitary assembly. In fact, the assembly is held together solely by this plastic coating. The assembly is intended to be flattened somewhat when installed on a chair frame, to place the springs in tension along a flatter cylindrical arc, and this tension is one of the main forces retaining the wires in place. The assembly, whether coated or not, is mounted at or near the ends of the individual wires on a suitable securing member of the frame. In preferred forms of the invention the plastic coating has an A scale Shore durometer between 45 and 90, so that the assembly is held together by the plastic coating without substantially restraining the flexing of the spring wires, while the coating also provides a spring action itself between the adjacent wires, by stretching and contracting, giving a two-way stretch. Front and rear border wires may be added to the assembly if desired and held to the adjacent sinuous wires by the plastic coating. A method for making such a sub-assembly is shown, as is a method for installing a sub-assembly on a suitable frame.

BACKGROUND OF THE INVENTION

This is a division of application Ser. No. 126,563, filed Mar. 22, 1971, now Pat. No. 3,767,261.

This invention relates to an assembly for seats and backs, usable in chairs, sofas, stools, benches, automobile and other transportation seating and the like. The seat and back units are sub-assemblies, applicable to any of various types of frames to provide seating assemblies embodying the invention.

A hard seat can at best only approximate a comfortable shape since human posteriors vary greatly. While seats theoretically might be tailor-made for each individual, this is costly and requires carrying the seats to wherever they are to be used. A better solution to the problem is a seat which automatically tends to shape itself to each user's posterior. A seat with the proper resilience in the right places is an important object of this invention.

The seated human body rests mainly on the ischial tuberosities, the two lower points of the pelvis. Additionally, it rests on the meaty and fatty flesh in a one-inch to two-inch radius therefrom. A flat hard surface becomes uncomfortable quickly, because the load is concentrated on the small area of the ischial tuberosities and the flesh immediately covering them is compressed with great force. A more comfortable condition can be achieved by spreading this load over a larger area, so that the unit area compressive force is substantially reduced. If the seat surface can be automatically shaped to conform generally to the sitter, this desirable spreading can be achieved. However, if a seat is too soft and the area is spread over too wide a surface, the result is to engulf the sitter too deeply, and this often results in a lack of security when the sitter feels that he is insufficiently supported. This is one reason why one often sees automobiles in which the owner has gone to the trouble of installing wooden slat accessory pads to make the seat firmer.

Dr. Bengt Akerblom, eminent Swedish authority on human posture, says in his book *Standing and Sitting Posture*, published by A. B. Nordiska, Bokhandeln, 1948:

"Naturally a rather soft seat would distribute the pressure over the tuberosities better than a hollowed rigid one. They are, however, so small that there would be very little sense in having a very soft and resilient seat. On the contrary, such a seat might be expected to transfer a not inconsiderable proportion of the weight onto tissues which are not adapted for bearing it. The best consistency for the seat would therefore be such that although it gave under pressure, it only gave slightly."

Proper resilience alone is not enough. Independent freedom of movement of such as that found in a two-way stretchable material more appropriately conforms to the human posterior shape, which itself has compound curvature.

While certain spring and padding combinations can afford proper yieldability and firmness, practically all padding materials have the fault of being good heat insulators. In a cold room, this might be acceptable temporarily, but people usually wear clothes appropriate for temperature conditions anyway and to sit for any length of time on a heat insulative material becomes uncomfortable because of inhibition of disperson of body heat in the human posterior area. Then, the person squirms in order to get to a cooler spot. Thus, anyone who, while dressed in a swimming suit, has tried to sit down on a seat of a convertible car that has been out in the hot sun, knows that the heat conditions of the seat can be unbearable.

Some prior-art seats have been made from spaced-apart wires, but the spacing of the wires has been such that too much load has been concentrated on too few wires, and this textural discomfort has made the use of upholstery pads requisite for such seats.

An ideal seat therefore has:

1. Proper shape, including proper compound curvature.
2. Proper resilience and firmness (resilience providing shape adaptability to each sitter).
3. Proper heat dispersion.
4. Proper surface contact area.

An object of this invention is to provide a seat more nearly approaching the ideal seat than has been achieved in the past.

Each unit or sub-assembly of this invention comprises a series of sinuous spring wires, held together solely by a thin sleeve-like plastic coating around each of the wires and bridging the wires where they touch or very closely approach.

The invention may be considered as an improvement over my earlier U.S. Pat. No. 2,803,293. In that patent, each of the sinuous springs had a hook on each wire which partially encircled a rigid frame member. This hooking did not positively prevent relative movement of the wires to the frame, nor did it hold them in proper position relative to each other prior to the seat's being coated with plastic. Partly because there was only line contact at best between the wire and the frame (and, unless the chair frame size was exactly matched to the size of the hook, there would be contact at only two points), the hooks tended to rotate when subjected to force, as when someone sat on the chair. Even after the chair had been coated with plastic, this instability was such that when the chair was being sat upon, the wire hooks tended to walk along the chair frame as the sitter shifted his position, thereby distorting the seat area, with the result of making the seat uncomfortable.

The chair of U.S. Pat. No. 2,803,293 was expensive to manufacture because the springs had to be put on the chair frame individually, carefully positioned there, and then either the entire chair had to be dipped or at least the upper portion of the chair from the seat up had to be dipped. Such dipping meant that all parts of the chair that were dipped were coated with plastic, unless something could be put on some parts of the chair to repel the plastic. Either alternative added substantially to the cost. Also, the coating dulled the appearance of chrome-metal furniture, and wood furniture was given a rather unpleasing appearance. Each such chair had to be made individually, and the springs themselves had to be put on to a full chair individually, so that the easy handling required by mass production was not possible. Also, great care had to be taken that the springs themselves were not distorted by the spring manufacturer during his manufacture; otherwise, the springs could not be properly bridged across by the plastic.

These difficulties are overcome in the present invention, which makes mass production quite feasible. Only the sub-assembly that is to constitute a seat unit or back unit is dipped, and this sub-assembly is relatively inexpensive and its manufacture is capable of automation and other mechanical aids. A very important feature is a provision of a sub-assembly capable of use on a wide variety of frames for different kinds and designs of seating units. The same sub-assembly may be sold to various manufacturers for incorporation into any of the wide variety of frames.

Another disadvantage of my prior chair was that the chair seat and back were substantially planar, and, even if they did have a slight bowing, they were installed in a generally flat, at-rest shape of the spring, so that there was little spring tension or cushioning action. In the present invention, it becomes possible to obtain much more tension, cushioning, and resilient support from the springs by virtue of making the sub-assembly as a cylindrical segment that is somewhat flattened when it is put on the chair frame, rather than making the chairs from a series of substantially flat springs. The tension of the wires pulling inwardly is the main force retaining the wires and the assembly.

Another important feature of the invention is the provision of a two-way stretch, which is obtained by using plastic coatings lying within a prescribed range of Shore A durometers. The springs can continue their flexing in the usual manner, without being overly limited by the coating, and also the spring assembly can flex and stretch the plastic when it bridges the wires. In the prior patent, it was possible to use a wide variety of materials, including hard plastics such as nylon which would certainly hold the wires together but would not themselves stretch, so that all the stretch had to be accomplished by the wires when such material was used. While this gave the seat some yieldability, it resulted in retaining a flat or somewhat cylindrical surface rather than giving a compound curve, which is obtained when sitting on a cylindrical arched seat that has two-way stretch. No two-way stretch was recognized or found in this type of chair until a desired range of durometers was discovered in this invention and used in proper relationship to suitable gauges of wires to enable achievement of this goal.

Even two-way stretchability and proper wire gauge alone have been found to be insufficient. Resistance to bounciness is an important property when considering the resilience necessary for a comfortable seat, and it is especially necessary in transportation seating where up-and-down motion tends to result in harmonic vibration, for harmonic vibrations subject the sitter to vertical oscillations for some time after a bump is traversed. Bounce-dampening is thus requisite and is partly accomplished in the present invention by proper choice of durometer of the plastic coating. More bounce-dampening can be achieved in this invention by variations in gauge or shape of some of the adjacent wires. If the durometer is too low a value, the springs are too free and are too ready to bounce. If the durometer is too high, the seat is too stiff and lacks the proper two-way stretch quality desired. Proper choice of durometer according to the principles of this invention enables the plastic to serve as a shock absorber and provides a snubbing action against bounce. Also, by making some of the wires different from others in gauge or shape, their harmonic vibration periods are made different, and they then help to provide a snubbing action.

The amount of the seating area occupied by the metal thickness and the thickness of the plastic coating are also important features to be considered, and little, if any, thought about these features is evident in the prior art. For example, in the drawings for U.S. Pat. No. 2,803,293, it can be shown that the metal occupies only about 14% of the silhouette of the area, whereas I have now found that for proper results the spring's steel should occupy a minimum of 17% of the silhouette of the area and a maximum of about 75%, with the range of 17% to 25% preferable generally. The coating should generally be about one-half as thick as the wire in order to give bridging, proper heat insulation and proper stretchability, but a range from about one-fifth of the wire thickness to about equal to the wire thickness can be used. Also the size of the void areas between the coated wires should be no greater than *about* 75% of the seat area used to accommodate one adult sitter and should not be less than about 2%, with about 60 to 75% being preferable.

SUMMARY OF THE INVENTION

The present invention comprises a seat or back sub-assembly which can be secured to various frames in various manners. Basically, the sub-assembly is a cylindrical segment later flattened somewhat upon installation. The sub-assembly thus comprises a series of arcuate, continuous, sinuous, spring metal wires, each of the wires closely approaching each of its immediately adjacent wires at frequent intervals. A thin sleeve-like plastic coating surrounds the wires, follows their sinuosity, and joins them together where they closely approach each other, effecting bridging between them at these close approaches. The wires and plastic coating comprise a unitary assembly defining the cylindrical arc which is intended to be flattened somewhat when the assembly is installed on a frame, thereby placing the springs in tension along a flatter cylindrical arc. This tension helps to hold the wires in place and to give springiness and resilience to the assembly. The coating constitutes the sole means holding the assembly together. The ends of the wires (or portions near the ends) are used to attach the sub-assembly to a frame, with the aid of suitable securing members. Rim members or border wires may be provided, especially if the sinuous wires have so much amplitude that they tend to provide a series of projections and recesses along the front edge of the chair which might tend to snag some clothing. The rim members are part of the assembly and are joined to their adjacent sinuous wires by the plastic coating.

A very important feature of the invention, which is not obtainable in structures where the wires are secured rigidly to a rim or surrounding frame, is that the assembly is capable of stretch *everywhere*, including along the edges, so that it becomes possible to obtain stretching right up to and including the edge of the seat or back. This capability is especially useful in installing the assembly on a frame having curved portions.

Since the wires are held together only by the plastic, it is important in the manufacture of the assembly to have suitable means for holding the wires in proper shape before and while they are dipped and until the coating is cured. This may be done by attaching each of them to a frame member which is dipped and then cut away, but since this wastes metal, the invention includes frame means for holding the wires and later releasing them from the frames. For this purpose, the free ends of the wires may not be coated at all, being held above the dipping solution that applies the coating, or they may be coated if that is desired.

Similarly, when the sub-assemblies are to be installed on the chair, it is desirable to have a tool for making the installation, stretching the ends apart and flattening the assembly and enabling the ends of the wires to be individually secured to suitable means on the frame.

When the assembly is installed as a seat, the rise from one end to another after flattening is preferably between a quarter of an inch and an inch. For the back, the curvature may be somewhat greater, preferably a radius of seven to eleven inches. The plastic, preferably, is in the range of between 45 and 90 Shore A durometer and seems to be best at about 75, so that the two-way stretch action previously referred to is attained.

A feature of the invention is that the wires cannot go straight across. They must undulate in order to be stretchable and they must be connected to each other by stretchable means, i.e., the coating within the desired range of durometers. This contrasts with my earlier patent which may allow flexible joints but does not require stretchable joints. Nor does it describe how to obtain them. A 150-lb. person sitting normally on the chair of the present invention will depress it by at least one inch (or at least $\frac{1}{18}$ part of seat height) and at most by about three inches (about $\frac{1}{6}$ part of seat height). As stated, the junctures are stretchable and flexible, but they are also tough, so that they cannot be pulled apart under the usual sitting conditions. Thus, while putty and kneaded erasers have a rubbery quality, they do not have the elasticity, stretchability, flexibility or resilience requisite in the coating used in this invention.

To get the best results in this invention, the area of the silhouette of the wires prior to coating should be at least 17% of the seat area, especially on a typical area. For sufficient bridging, heat insulation, and surface cushioning, the coating should be at least about 20% of the wire diameter. If the seat were made from springs alone, the comfort would be insufficient, particularly when used in moving vehicles, for it would be too bouncy. Proper durometer and proper thickness of the coating relative to the wire thickness help to prevent this bounciness. The reason they do this is similar to the reason that a car is not comfortable with metal springs alone; it also needs the rubber, air, and hydraulic fluid in the combination of rubber pneumatic tires and hydraulic shock absorbers before it can be comfortable.

BRIEF DESCRIPTION OF THE DRAWINGS

Other objects and advantages of the invention will appear from the description of some embodiments of the invention, which will be described with reference to the following drawings.

FIG. 1 is a view in perspective of a chair embodying the principles of the invention.

FIG. 2 is a view in perspective on an enlarged scale of a seat or back unit or sub-assembly embodying the principles of the invention, the sub-assembly being shown before it is installed on the chair frame of FIG. 1 and while it has its natural cylindrical arc.

FIG. 3 is a diagrammatic view in end elevation, showing the difference in radii of the cylindrical assembly of FIG. 2 and the installed seat of FIG. 1, where the arc has been somewhat flattened out, thereby placing the spring wires under tension.

FIG. 6 is a fragmentary enlarged view in perspective of a front corner portion of the chair of FIG. 1 with the sub-assembly somewhat flattened out and partially installed on the chair frame. Most of the brackets have been bent down into shape, but one of them is shown before being moved to its locking position.

FIG. 7 is an enlarged view in section taken along the line 7—7 in FIG. 6.

FIG. 8 is a view similar to FIG. 6 of a modified form of the invention. Some parts have been broken off or broken away to show the structure more clearly.

FIG. 9 is an enlarged view in section taken along the line 9—9 in FIG. 8.

FIG. 10 is a view similar to FIG. 9 of a modified form of installation of the end of one spring, this time on a wooden frame.

FIG. 11 is a view similar to FIG. 6 of another modified form of installation and a modified form of sub-assembly, as well as a modified form of securing member and frame.

FIG. 12 is a somewhat enlarged view in section taken along the line 12—12 in FIG. 11.

FIG. 13 is a view similar to FIG. 6 of another modified form of the invention with the wire ends of the sub-assembly being hook-shaped and with a different form of attaching means to the chair frame being shown.

FIG. 14 is a somewhat enlarged view taken along the line 14—14 in FIG. 13.

FIG. 15 is a view similar to FIG. 6 of another modified form of installation, with the sub-assembly like that of FIG. 6 but with the frame and frame securement different.

FIG. 16 is a view in section taken along the line 16—16 in FIG. 15.

FIG. 17 is a fragmentary view in perspective generally similar to those described above but showing an opposite end portion of a seat with a sub-assembly like that of FIG. 2 installed in a different type of chair frame and anchor installation. Parts are broken away and shown in section.

FIG. 18 is an enlarged view in section taken along the line 18—18 in FIG. 17.

FIG. 19 is a view in end elevation of a tool being used to hold the sub-assembly during dipping in a solution of plastic that provides the coating.

FIG. 20 is a view in perspective of the tool of FIG. 19 with part of the sub-assembly shown and part of it broken away. The sub-assembly is shown in tensed position ready for assembly onto a chair frame.

FIG. 21 is a view in side elevation of the tool of FIG. 19, showing its use in installing the sub-assembly on a chair frame. The upper portion of the chair frame is broken away to conserve space.

FIG. 22 is a view in side elevation of two compactly stackable chairs embodying the principles of the invention shown stacked on each other and showing how the seat and back nest. A portion of the back of the lower chair is broken away to show the back of the upper chair and the relationship between the two.

FIG. 23 is a diagrammatic view showing how the two backs fit together in FIG. 22 and showing the relationship between the chord of the back of the lower chair and the arc of the back of the upper chair.

FIGS. 29 to 37 are all top plan fragmentary views of various patterns of the arcuate sinuous members; in each instance portions of wire are shown uncovered. Plastic links the adjacent spring members together. Various patterns are shown as illustrative of the many many more that are possible in this invention.

DESCRIPTION OF SOME PREFERRED EMBODIMENTS

Figure 4:
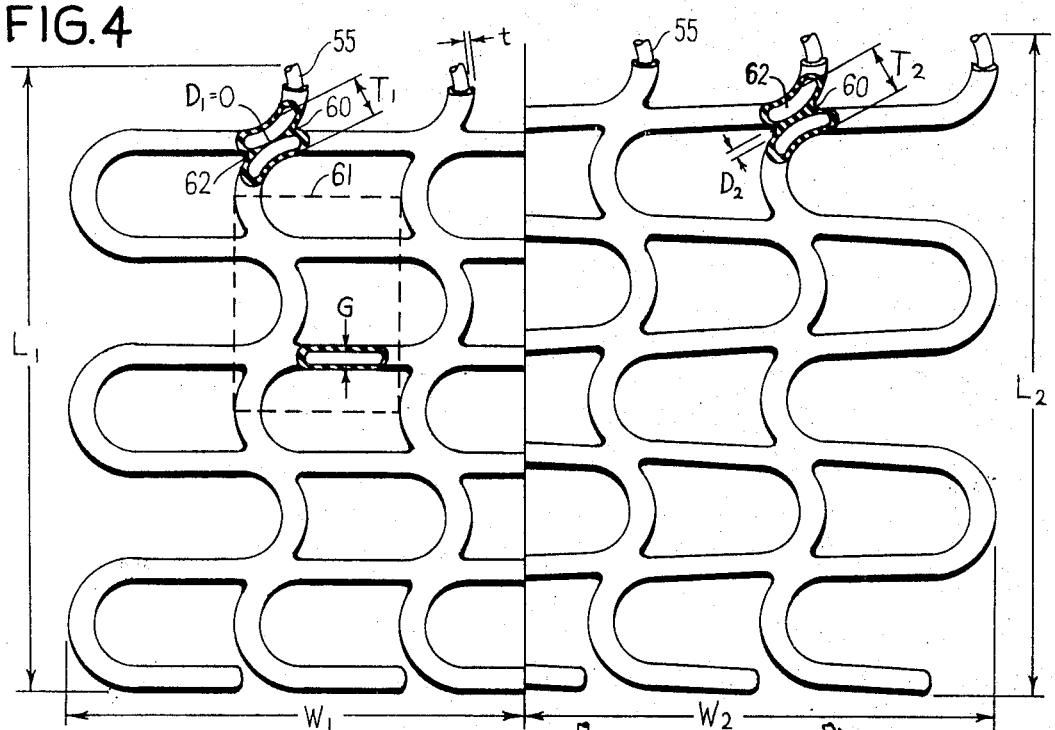
FIG. 4 is an enlarged top plan diagrammatic view in two halves illustrating the two-way stretch effect of the sub-assembly.

An Example of a Chair Embodying the Invention (FIG. 1)

Many many types of seating units may embody the principles of this invention, including chairs, sofas, davenports, benches, stools, automobile seats, bus seats, camp chairs and so on.

A chair 40 is shown in FIG. 1 for the purpose of giving one example of a type of seating unit that can embody the principles of the invention. This example is not to be construed as representing all types of seating units, or even all types of chairs which can be used with the present invention, for they may vary greatly in frame, structure, appearance and so on. The basic part of this invention is concerned with the seating and back units more than with the framework of the chairs themselves.

The chair 40 has front legs 41 and 42 and rear legs 43 and 44 which continue up, preferably at an angle, to form back frame portions 45 and 46, preferably having some curvature. The number of pieces used in making the chair frame is immaterial to this invention, and whether the frame is continuous or whether the pieces are welded or otherwise secured together does not matter so far as the present invention is concerned. Generally horizontal side frame portions 47 and 48 join the front legs 41 and 42 to the rear legs 43 and 44 where they meet the back frame portions 45 and 46. The frame members 47 and 48 may have some curvature, the effect of which will be referred to later. A seat unit 50 is supported by the side frame portions 47 and 48 and a back unit 50A is supported by the frame portions 45 and 46. The seat unit 50 and the back unit 50A are very similar to each other and in some instances may be identical, but usually the back unit 50A is somewhat smaller than the seat unit 50, and it is usually made from a smaller gauge of wire.

The chair of FIG. 1 is completed by a pair of transversely extending members 51 and 52 which serve to rigidly space the two sides of the chair apart. The particular form and placing of the bracing or transverse members is not significant in the present invention, though, of course, there must be some rigid means for holding the frame portions 47 and 48 apart and for holding the frame portions 45 and 46 apart. In the particular form of the invention shown in FIG. 1, the back frame portions 45 and 46 are rigidly held parallel to each other, and the side frame portions 47 and 48 are rigidly held parallel to each other. This parallelism need not always be present, though it is preferred.

An important feature of the invention is the ability of the seat assembly 50 and the back assembly 50A to accommodate themselves to the curvature, respectively in the frame portions 47 and 48 in the frame portions 45 and 46. Their ability to follow this curvature is due to the use of the two-way stretch of this invention, all the way to the edges, as will be discussed later. It is important here to call it to the attention of the reader, because it is something that cannot be done with most assemblies of this kind, since a seat or back assembly must be free to stretch right up to its edges in order to make this particular embodiment feasible.

The Seat Unit 50 (FIG. 2)

FIG. 2 shows the seat unit 50 before it is incorporated into the chair 40. The view also represents basically what the unit 50A looks like, although the unit 50A may be different in size, or even in structure or appearance where that is desired.

In this example the sub-assembly 50 comprises a series of sinuous spring wires 55, 55a, 55b, . . . 55n each of which is naturally arched into a circular arc of the same size and shape. As a result, the assembly 50 is a cylindrical segment or arc. These springs 55, 55a, etc., may have any of many different shapes, some of which are shown in FIGS. 29 to 37. They may be of the type often called "non-sagging springs" sometimes sold under the trademark "No-Sag"; each spring has two free ends 56 and 57. Typical wires of this type are of spring steel, having 0.60 to 0.75% carbon and 0.90 to 1.20% manganese. Tensile strength typically runs about 215,000 to 265,000 p.s.i., and their Rockwell hardness is about 39–41 RC range. The diameter of the wires 55 preferably lies in the range of 0.05" to 0.15". Too thick a wire tends to concentrate the stiffness too much and the seat is too firm, while too thin a wire makes the seat too soft.

The spring members 55, 55a, 55b, . . . 55n are placed tangent to each other, two extreme wires 55 and 55n lying at or near the ends or edges of the assembly. However, in this particular embodiment, though it is not always necessary, a pair of circularly arched spring wire members 58 and 59 are shown lying tangent, respectively, to the wires 55 and 55n. The wire 58 thus closes off the loop of and lies tangent to the wire 55 and makes a circular shape, so that there are no projections that might tend to catch on clothing, and the same is true of the wire 59 that lies tangent to the wire 55n.

Each wire 55 touches its adjacent wires at least once per cycle. The touching may actual contact or may be approximate touching or close approach, because, as will be seen, the assembly 50 is held together in a way that does not require actual physical contact of the wires 55 at each point of tangency. However, there is always a very close relationship if not an actual touching. The wires 58 and 59 become respectively the front and rear edges of the seat 50, and this takes place on installation. The free edges 56 and 57 lie along the sides of the seat 50 and are fastened to the chair frame, as will be seen.

A thin sleeve-like plastic coating 60 surrounds the spring wires 55, follows their sinuous shape and bridges the wires 55, 55a etc., where they substantially touch each other. Preferably, the plastic coating 60 is about one-half the wire thickness, or in the range of one-fifth of wire thickness to about equal to the wire thickness. At the junctures, the thickness may be mostly greater, though the wires themselves may touch. The plastic coating 60 also surrounds the border wires 58 and 59 and links them to their adjacent wires 55 and 55n. This plastic coating 60 thus joins the entire sub-assembly 50 together, and in fact, it is what makes it a sub-assembly. It holds the wires 55 etc., to each other as they span between their ends and it holds the border wires 58 and 59 to the extreme springs 55 and 55n at each point of tangency. The result is the arcuate or cylindrical arc-shape, typically like that shown in FIG. 2, although the arc may be somewhat flatter or somewhat rounder.

Thus, the complete assembly 50 is a unit which can be sold or shipped as a unit and can be assembled to the chair 40 of FIG. 1 or to many other kinds of chairs, so long as the proper size and shape is accommodated for in one way or another, that is, either by the chair itself being sized to go with the seat unit 50 or the seat unit 50 itself being made so that it will go with the chair frame or other type of seating unit frame. The unit 50 by itself is capable of mass production and is easily assembled into a chair or other seating unit by securing the two ends 56 and 57 of each wire 55 etc., to a suitable rigid frame.

The Significance of Flattening the Cylindrical Arc (FIG. 3)

FIG. 3 shows diagrammatically what happens when the unit 50 of FIG. 2 is put into the chair 40 of FIG. 1. The round cylindrical arc of FIG. 2 with radius R1 is flattened from the shape shown at the bottom of FIG. 3 to the shape shown at the top of FIG. 3 where it has a larger radius R2. The unit 50 then has a broader span, and its arc is somewhat flattened so that it can be used as a seat. It has a crown height $h$ shown on the drawing, and it is still a cylindrical arc, though much flatter.

This flattening of a round assembly is an important feature of the invention. By forming the unit 50 initially as a cylindrical arc, which is quite round and fairly well closed, and then flattening it considerably, a large amount of desirable tension is placed into the completed unit 50 so that the seat has a springy feel to it, acting substantially as though there was a large cushion instead of simply an assembly of thin springs. The exact amount of crown height $h$ or of curvature depends, of course, somewhat on taste, but generally there will be about a maximum of one-inch crown height $h$ in a sixteen-inch wide seating unit 50, and the proportion is usually best considered as being a crown height $h$ of one-sixty-fourth to one-sixteenth of the span.

The amount of force required to flatten a seat of typical dining chair size is important as well. For purposes of the present invention, it has been found that a collection of springs in an assembly 50 requiring a force of between 340 pounds and 680 pounds to flatten it gives the seat a proper tension, and preferably the amount is around 500 pounds. This is the force exerted in pulling the two ends 56 etc., and 57 etc., apart to an appropriate distance to fit onto the chair frame portions 47 and 48.

For the chair back, somewhat different rules apply, and it will be noticed that in the chair in FIG. 1, as in most such chairs, the arc of the back 50A extends rearwardly and is not something that the sitter tends to flatten; rather, he tends to increase the arc curvature, reducing its radius.

In both the seat and the back, the tension of the wires pulling inwardly, resulting from flattening, is the main force retaining the wires.

Figure 5:
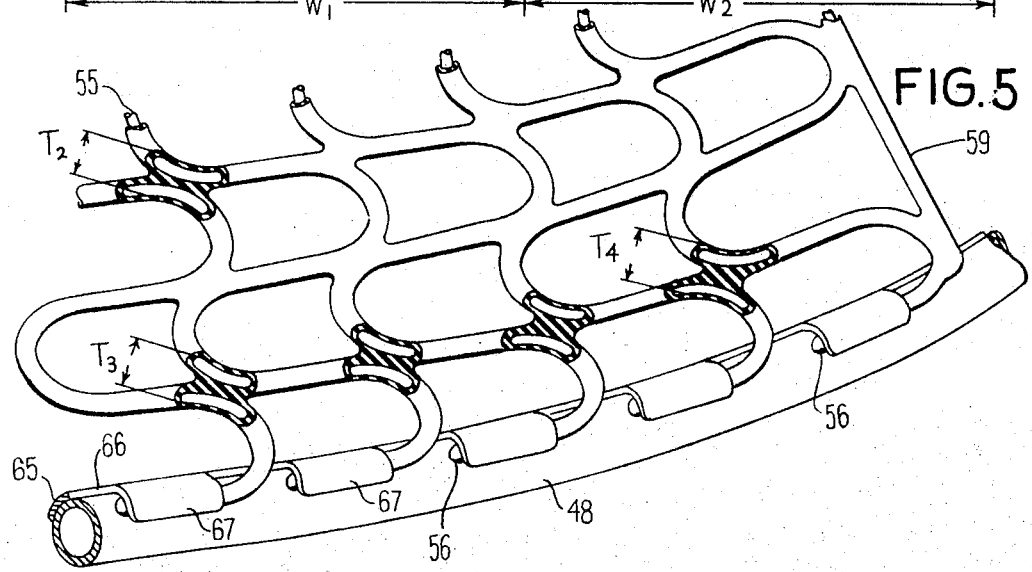
FIG. 5 is a fragmentary view in perspective of a portion of a seat assembly of the invention installed on a chair as the seat thereof and showing a corner near the rear of the seat. This view illustrates the adaptability of the invention to double curvature in the seat, as occasioned by curvature of the supporting frame.

Significance of the Plastic Coating 60 (FIGS. 4 and 5)

The plastic coating 60 may be chosen from various types of plastic, such as polyvinyl acetate, polyvinyl chloride, mixtures thereof, other vinyl compounds, polyethylene, butadiene, acrylic elastomers and so on. The material may be transparent where that is desired or may be opaque and impart its own color to the unit. It may contain dye or pigment which imparts the desired color, completely preventing view of the wires 55 themselves and giving the appearance of constituting the actual seating material. The plastic coating 60 may be semi-transparent and may give shade or tone to the overall color.

In this invention the plastic is confined to the unit 50 or 50A and is not applied at all to the chair frame, so that the chair frame may have any surface or treatment that is desired without interference from the nature of the plastic coating.

The sinuous wires 55 are not welded to each other at their points of tangency but are held together only by the plastic coating 60, with the wires 55 either touching each other or even slightly apart but closely approaching each other. The same is true of the connection between the wires 55 and the arcuate border wires 58 and 59.

An important feature of the plastic coating 60 is that by choosing the proper range of durometer, a two-way stretch effect can be obtained, as illustrated in FIGS. 4 and 5. The springs 55 not only stretch in the well-known manner of non-sagging springs, but in the present invention the plastic coating 60 between the adjacent springs 55 also may be stretched, and this two-way stretch effect gives a wide range of resilience to the seat 50. If the plastic 60 is too hard, there can be substantially no such stretch, and if the plastic 60 is too soft, there will be too much stretch, and the springs 55 themselves are not availed of properly so that the unit 50 may even be torn apart after some use. By holding the Shore A durometer of the plastic coating within critical values, the effect is right with sufficient rigidity so that the springs 55 are taken advantage of and so that they are held apart with sufficient resilience so that the whole is not encased in a rigid cover. I have found that the durometer range necessary to achieve this critical range is from about 45 to about 90 Shore A scale durometer, with a preferable value of about 75.

In FIG. 4 there are two portions. The left portion illustrates part of the seat 50 before it is sat upon, with the springs 55 therefore in their normal configuration. A typical area 61 is shown outlined, this area comprising one complete cycle of wires 55, so that it is representative of the total area of the seat 50 so far as the percentage of metal silhouette per total area is concerned. This area can therefore be used for determining accurately the silhouette of the wire and its average occupation of the seat area. Taking the gauge or wire diameter as G, the length of the wire can be determined in terms of G by measuring the length of the center lines of all the wires 55 in the area 61 in terms of G, and the value is found to be 34G. The area 61 itself measures 14.6G by 10.7G, which is 156.22G$^2$. The silhouette area of the wire in the area 61 is 34G$^2$, which is 21.76% of the area 61. This value lies within the range of 17% and 75% of the seat area mentioned earlier, the preferred range being about 17% to about 25%.

Also, the empty spaces between the coated wires should be no greater than about 75% and no less than about 2% of the area of the seat surface, and the range of about 60% to 75% is preferred. The minimum of about 2% is to provide sufficient air ventilation.

The wires 55 in the seat 50 lie closely adjacent each other and nearly touch at points of near tangency, where the distance D1 between them may be as low as zero, as shown in FIG. 4 and where the overall distance from the outside to the outside is T1. The plastic coating 60 forms a bridge fastening the wires 55 together at 62 and has a thickness $t$.

The right portion of FIG. 4 illustrates what happens when the seat 50 is stretched, as when it is sat upon or when installing the assembly on to the frame. The length L1 in the left portion extends to the longer length L2 in the right portion. The width W1 in the left portion extends also to become the width W2 in the right portion. The distance D1 in the left portion has stretched to become the distance D2 in the right portion, and the distance T1 has become the distance T2. Thus is seen the importance of the bridge or juncture 62 and of the stretchability of the plastic 60 at this bridge or juncture 62. This of course is also related to the thickness $t$ of the plastic coating 60.

A glace at the seat 50 might lead one to conclude that the surface configuration would be texturally uncomfortable. However, this conclusion would be mistaken, for the seat 50 acts differently than one might at first conclude for the following reasons:

(1) The average occupation by the wire of the typical area (i.e., at least 17%) is so great that the human posterior is supported without concentrating the load too much. In contrast, if the wire occupies less than about 17% of the area (e.g., the 14.4% occupation of the FIG. 2 area in U.S. Pat. No. 2,803,293), the seat would be texturally uncomfortable.

(2) The empty spaces constitute at least 2% of the seat area, in order to give sufficient air ventilation, and preferably occupy much more of the seat area, up to about 75%.

(3) The wire 55 is not exposed bare metal, which would be highly heat conductive and therefore unpleasant and uncomfortable. The wire 55 is adequately coated with plastic 60, which is low in heat conductivity; so it is pleasant and comfortable to sit upon.

(4) The coating 60 lies within the range of Shore A durometer (45 to 90) where it is neither too hard nor too soft; in fact it tends in itself to provide some cushioning effect and its action at the bridges 62 adds to the comfort. Without this, the seat 50 could be too hard or too soft.

(5) The two-way stretch discussed above provides automatic contouring, offering minimal resistance to the human posterior. Without this two-way stretch, the seat 50 might become increasingly uncomfortable.

In this invention the two-way stretch phenomenon extends over the entire assembly 50 or 50A. In assemblies not of this invention where the ends of the wires are held rigidly either to the seat frame or to a sub-assembly rim or frame, the action is different. In this invention the installed seat may be held rigidly at the ends but during installation it is possible to obtain a stretch along the ends or edges, which would be impossible if the unit were rigid at its edges or near there or if the springs had to be installed on the chair frame before they were dipped. It is clearly apparent that if the assemblies are held rigidly at the edges, they cannot be stretched there. The effect of having to be installed as an assembly *after* coating may be less apparent; to understand why it is important to install the assembly as a unit, it is first necessary to see that it is important for the plastic to bridge across the wires at their points of tangency, and then to note that it is not feasible to attach the wire members to the frame in such a way that they become too far apart to be bridged by the plastic upon dipping.

It is not desirable to fill in all the openings with plastic. It is very important, in fact, to have openings through the chair seat and back and to have the coating confined to the areas immediately around the wire and not to extend across between them, because then the seat would become a heat insulative barrier, and the chair would become uncomfortable.

In the present invention, the assembly is made so that the only thing holding the wires together is the plastic and the assembly is made separate from the chair; so it becomes possible to install the wire ends as shown in FIG. 5 into positions where even upon initial installation there is some stretching of the unit 50, and the stretching may be different at some points than others due to this expedient. Thus, as shown in FIG. 5, the unit 50 is shown with one part of its stretched so that the adjacent wires are definitely apart from each other, with the plastic coating providing the stretch at the junctures. Thus, it is the plastic that provides the stretch and not the spring wires themselves, as shown by the stretching at T2, T3, and T4; due to that, quite a different type of action is obtained than where the reliance has to be made upon the spring wires, which would tend to provide considerably more tension and an undesirable amount of tension at some points. While the ends 56 of the wires 55 in FIG. 5 are held rigidly after they are installed, and they cannot then slip or slide along the chair frame portion 48, nevertheless, the installation itself achieves a result different than where the assembly and frame both have to be without curvature upon installation and where any desired curvature would have to be later applied. The frame portion 48 is curved, and the seat 50 is able to take this curvature by virtue of having no rigid fastening any place but by the entire assembly being held together only by the plastic coating 60. This is the significance of the frame curvatures shown in FIG. 1 in the frame portions 45, 46, 47, and 48. Not only are frame curvatures prior to assembly thereby enabled, but also increased comfort for the sitter is thereby obtainable.

Friction Fastening of the Wires to the Rim
(FIGS. 1 and 5-7)

Many means of fastening the spring ends 56 and 57 to a frame member may be employed. Some of them are illustrated in the drawings in order to give some idea of the wide variations that are possible under this invention, but of course there are many others that could not be shown without the specification becoming too long.

In FIGS. 1, 5, 6, and 7 the frame member 48 is provided with a securing member 65 which is a cylindrical segment, as seen in cross section, and has a main body portion 66 that may be welded to the frame member 48, a similar one being welded to the frame member 47. A series of projecting tongues 67 are provided, which may be initially bent up as shown at the left in FIG. 6 and then bent down into place as shown on the right, after the wire ends 56 have been approximately positioned so as to lock the wire ends 56 into place firmly by the members 67, clamping them between the members 67 and the frame 48. As shown in FIG. 5, this may extend along a curve or as shown in FIG. 6, it may extend along a straight line. Both are equally possible in the present invention, and this is a very important and unique effect of the present invention. It will be seen that with the members 65 welded on the frame members 47 and 48, installation is a relatively simple matter, involving principally flattening out and stretching the arc of the sub-assembly 50, anchoring one end of it first and then anchoring the other end. The plastic 60 may cover the ends 56 or may not, but installation is the same in this instance in both forms. Preferably, a plastic bearing block 68 lies below each tongue 67. This bearing block 68 is preferably made from plastic that is stiffer in consistency than the coating 60, and it serves as a cushion preventing the tongues 67 from abrading or cutting through the coating 60.

FIG. 6 also shows the anchoring of one border wire 58, a portion of the plastic having been broken away from the wire ends 56 and 58 in order to show the operation, though in this particular figure it is not intended that they be actually uncovered. Thus, the wire 58 may have an end portion 69 secured by butt weld to the wire end 56, or both ends 56 and 69 may be loose, and a tongue 67 and block 68 may embrace them both. It may be the same tongue 67 or two adjacent togues, as desired. In fact, they may be spaced apart and separate togues used.

A Modified Form of Attachment Employing Holes in the Frame Member (FIGS. 8 and 9)

In FIGS. 8 and 9 a frame member 48a is provided with a series of openings 70, and in each opening 70 a socket member 71 preferably of a hard plastic material is inserted. The socket 71 may have an outer flange 72 for locating it against the wall of the tubular member 48a. It may have upwardly extending barbs 73, so that once installed, it cannot be withdrawn except under great stripping force, probably with destruction of the item itself, and it may also have some down turned interior barbs 74 inside its tubular opening 75. In this instance ends 76 of the wires 55 are bent at substantially right angles to the plane of the seat 50; this bending may be by a smooth curvature instead of a sharp angle, of course. The wire ends 76 are installed in the chair frame by inserting each end 76 into one of the socket opening 75, pushing them down far enough so that they pass by the barbs 74 and, preferably, so that they lie substantially flush against the flange 82. Then, the barbs 74 prevent retraction of these wire ends 76 and hold them quite satisfactorily.

FIG. 8 also shows a border wire 77 that is not straight but is sinuous; however, the border wire 77, while meeting the wire 55 along an arc 78 instead of a mere tangency, has much less amplitude and is non-snagging to clothing while imparting a pleasing curvaceous appearance to the front edge. Its end is locked in place in the same way as the ends 76. It is more able to stretch itself than a straight border wire.

FIG. 8 also shows a sinuous wire 79 of a different length and shape from the other wires 55. The function of the wire 79 is to introduce a member with different vibration characteristics from the other wires 55. The effect of this is to provide bounce-dampening; a feature usually found necessary in transportation seating. The wires 55, characteristically having one vibration frequency, are attached to the wire 79 which has a different vibration frequency. This fact causes the structure to have its bounce characteristics to be strongly modified if not totally eliminated.

Installation of an Assembly 50 in a Wood Frame (FIG. 10)

FIG. 10 is a small sectional view illustrating the installation of the assembly 50 to a wood frame member 80 by one feasible means. In this instance, there is a deep slot 81 in the wood member 80, which may be rectangular or round, since external shape makes no real difference in this installation. The slot 81 is deep enough for locating each of the wire ends 56 substantially as shown in FIG. 6. Then a dowel or pin 82 of plastic or wood is inserted transversely across each wire end 56 through an opening 83. Once again, the chair is easily assembled by having the assembly 50 stretched out, one end 56 of each wire 55 being located in the slot 81 and the dowels 82 put in one by one.

A Modified Form of Securement (FIGS. 11 and 12)

In FIGS. 11 and 12 a U-shaped channel chair frame member 85 is shown. This member 85 may be either the chair frame or an attachment to a tubular frame, if desired, and in the latter case would fit over it and be welded or bolted or otherwise secured to it. The channel member 85 has tongues 86 bent out from openings 87, and they act to receive the wire 55 in substantially the same way as did the tongues 67 in FIG. 6. While the wire ends 56 may be installed in the tongues 86, the wires 55 etc. may be held not at their actual ends 56 but one or more cycles parallel to the end, as in FIG. 11 where wire portions 88 are held by the tongues 86.

By way of illustrating the variations possible in this invention, the plastic 60 is used to make a substantially continuous edge rim 89, by having the wire ends 56 extend close to the adjacent wire, so that they can be bridged over at this point and make a continuous plastic rim. The front border wire 58 may have its end 69 welded to a wire end 56.

Another Modified Form of Installation (FIGS. 13 and 14)

In FIGS. 13 and 14 an assembly 90 (generally like the assembly 50) is shown, and a chair frame 91 may have slots 92, which extend circumferentially and are longer circumferentially than they are wide. The spring ends 93 of the assembly 90 may be bent and hooked. These hook portions 93 are installed into the interior of the tubular member 91 through the slots 92, and then a dowel rod 94 or other member is installed along the complete length of the frame member 91 to hold the hook portion 93, and thereby the assembly 90, in place. The dowel rod 94 may have some flexibility, and may be plastic, especially for installation in a somewhat curved frame 91.

Another Installation Using a Flat Frame (FIGS. 15 and 16)

In FIGS. 15 and 16 a flat frame 95 is used having a series of projections 96 which may be elliptical or oblong with arcuate ends and about which the wires 55, 55a, etc. may nest adjacent their ends 56. After the nesting has been done, an angle-shaped locking member 97 may be placed over them and held in place by a series of screws 98, as shown in FIG. 16. The projections 96 may be dimples, as shown, with screw-receiving openings 99.

In this form of the invention, it will be seen that the wires 55a and 55b are of different wire gauges; this is quite possible in the invention, for the wires 55 need not be of uniform gauge throughout. Lighter wires can be used at the ends and heavier wires used in the center portions of the assembly 50, and this is often desirable. An additional feature of varying the wire gauges is that it helps to dampen vibrations, that is when wires of dissimilar gauges are attached to each other, the rebound or oscillation rates are dissimilar, and thus they act to dampen each other. Other advantages are obtained, such as stiffness where stiffness is desired and flexibility where that is desired.

Another Form of Installation (FIGS. 17 and 18)

In FIG. 18 a frame member 100 is shown having a continuous lengthwise-extending slot 101, through which the ends 57 of the wires 55 may be installed. Inside each of the members 100 is a segmented arcuate member 102 having a series of slots 103 with tongues 104 between them. Each of the wire ends 57 is inserted through a slot 103 and is prevented from retraction by the tongue 104. In this instance, the wire ends 57 may be inserted into the slot 103 and tongue 104 before the member 102 is installed, or the member 102 may be in place before the wire ends 57 are installed.

Other means of installation may be used, including spot welding the wire ends 56 and 57 to the chair frame or to a sub-assembly therefor.

A Method for Making the Assembly 50 (FIGS. 19 and 20)

FIGS. 19 and 20 illustrate some apparatus for and some aspects of a method for making the assembly 50. In this case, a tool 110 has two L-shaped handle members 111 and 112 joined together by a pivot pin 113. Each one of the handles 111, 112 has a series of serrations 114 for seating a ring 115 that may be used to hold the handles 111, 112 in a desired position. At one end of each of the members 111, 112 is provided a bracket member 116 very much like the member 102 just discussed. Each member 116 has tongues 117 and slots 118 along its extremity. The tool 110 may be strengthened by diagonal members 119 which keep it rigid, so that the two bracket members 116 are parallel and straight.

Each wire 55 is hooked at or near its ends onto the two bracket members 116 and spans between them, and the tongues 117 and slots 118 are so spaced that the wires 55 are automatically aligned to lie tangent to each other. They are preferably installed so that they are somewhat flattened from their natural shape in order to get the tension that will hold them to these bracket members 116. When the wires 55 have been individually installed, the whole may be dipped as shown in FIG. 19. The tool 110 may spread the ends 116 apart, so that the wires 55 are arched, as shown, either wider or narrower than their natural arc, but usually wider. The ends 56 of the wires 55 need not be dipped, as shown here or the whole may be entirely dipped, with later some parts being bare where the touch the tool 110. The tool 110 itself may be coated to repel plastic in such a way that it will not be coated even if immersed, or, as shown in FIG. 19, it may be held so that no part of it gets immersed. Immersion coats the wires with plastic 60, and this plastic, upon curing, thereby forms the assembly 50.

This is, of course, only an example of many forms of such tools or other mechanical aids that may be used in making the sub-assembly 50. It is possible to make the sub-assembly with the aid of more sophisticated machinery so that the operation can be automated. After dipping and cure, the assembly 50 is removed from the tool 110 and may be stored as a cylindrical unit. Several assemblies 50 may be nested within each other, if desired.

A Method of Installation of the Sub-Assembly 50 on a Chair Frame (FIG. 21)

FIG. 21 shows that the same tool 110 which was used in making the assembly 50 may also be used to install the assembly 50 on a chair frame by stretching out and flattening the assembly 50 and by hooking its wire ends 56 and 57 over suitable securing devices such as the devices 65 shown in FIGS. 1 and 6. Once the wire ends 56 and 57 have been caught and held by the members 65, the assembly 50 may be released from the tool 110 and the tool withdrawn.

Application of the Invention to Stackable Chairs (FIGS. 22 and 23)

Compactly stackable chairs such as those shown in my U.S. Pat. No. Re. 26,071 may be used in conjunction with the present invention to provide a more resilient seat than the hard seat heretofore used with those chairs. As shown in FIG. 22 a chair frame 120 may have curved lines, as discussed in FIG. 5 by virtue of this invention, and the seats 121 and backs 122 are easily made so that they nest within each other when the chair frames 120 are stacked, so long as the chairs themselves are of stackable structure. Any type of stackable structure may be used with these seats and backs, and since they are quite thin, a compactly stackable structure becomes feasible with the stacking height of a set of chairs being determined basically by the thickness of the chair frames 120. These chair frames, if desired, may be made quite thin.

FIG. 23 shows how the backs 122 stack one within the other. It will be seen that the chord across the arc of the one chair intercepts the arc of the next adjacent chair. The same basic configuration also applies to the seats.

Figure 25:
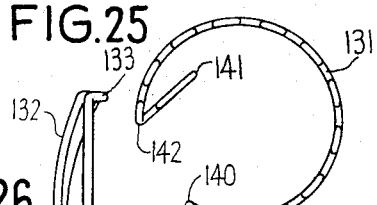
FIG. 25 is a view in end elevation of a sub-assembly generally like that of FIG. 2, as used in the chair of FIG. 24.
Figure 24:
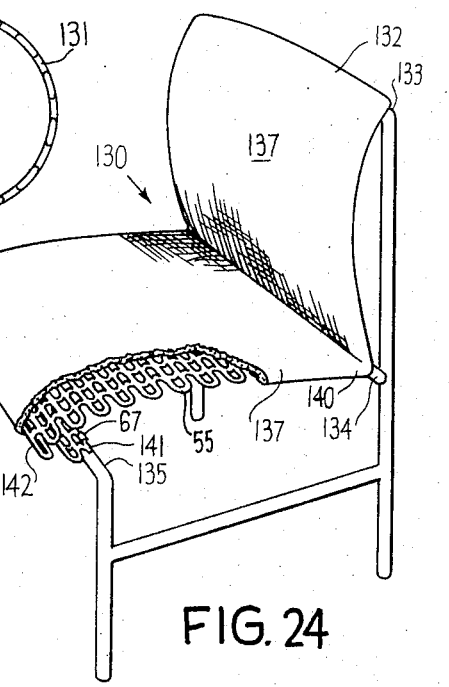
FIG. 24 is a view in perspective of a modified form of chair embodying the principles of the invention.

A Fore-and-Aft Chair Seat Arrangement (FIGS. 24 and 25)

FIG. 24 shows a chair 130 incorporating a seat assembly 131 and a back assembly 132. The back assembly 132 is substantially like the back assembly 50A, with two major exceptions. First, the frame members 133 and 134 to which the back assembly 162 is secured extend horizontally rather than vertically. Second, the assembly 132 bows forwardly as seen from a side view and rearwardly as seen from a top view curving along a vertical arc. By virtue of the stretchability of the back assembly 132, the lower frame member 134 supporting the back 132 may be straight while the upper member 133 is curved. (See FIG. 26 which has an identical member 133.) There are no border wires, so that the wires 55 are free at each side, but since they are at the sides of the chair frame, they are unlikely to catch on clothing. Furthermore, in this particular form of the invention the plastic covered wires 55 are covered with fabric 137, so that the wires are not truly exposed and do not present that apparent hazard.

The seat member 131 is basically like the back member 132, but has an important difference. The similarities are that the wires 55 are free at each side, that the seat is covered with fabric 137 and that the seat member 131 has its wire ends 140 and 141 secured to transverse-extending chair frame members 135 and 134. The difference is that a sharp bend 142 is provided, spaced from but relatively near the end 141. This bend 142 functions (a) to give the chair its fore-and-aft seating pattern, which obviously differs from the side-to-side pattern of the chair shown in FIG. 1, (b) a resiliency at the front which is extremely desirable, and (c) an accentuated curve at the front end which makes the chair more comfortable than it would be if this were absent.

Figure 27:
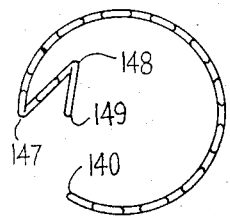
FIG. 27 is a view in end elevation of a unit sub-assembly for the seat of the chair of FIG. 26.
Figure 26:
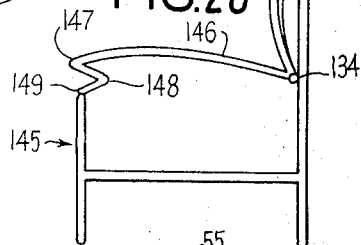
FIG. 26 is a view in side elevation of another modified form of chair embodying the principles of the invention.
Figure 28:
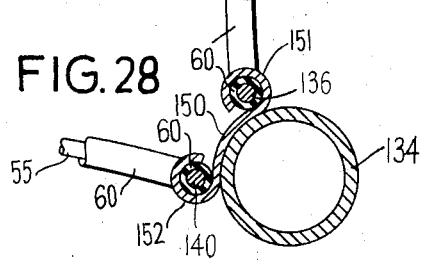
FIG. 28 is an enlarged view in section of the fastening of the sub-assembly for either FIG. 24 or FIG. 26 to the chair frame in those views.

Another Fore-and-Aft Seat Arrangement (FIGS. 26 to 28)

A chair 145 is shown in FIG. 26 having a seat assembly 146 and a back assembly 132 like that of the chair 130. The difference between the seat assembly 146 and the seat 131 is that the seat assembly 146 has what is sometimes called a "fishmouth" construction, with two sharp bends 147 and 148 adjacent a forward edge 149. The rear end member 140 is the same as in the chair 130. The fishmouth structure gives the seat 146 additional springiness and comfort and it is considered desirable by some manufacturers.

FIG. 28 shows how the wire ends 140 of the seat 146 or 131 and the wire ends 136 of the back 132 can be secured to a single horizontal frame member 134, with the aid of a securing strip 150, similar to the strip 65, which receive both wire ends 140 and 136, with the aid of a series of a pair of ears 151 and 152 secured to the frame member 134, as by a screw or by welding. The wire ends are installed thereby in a bracket 150 which is held by a single frame member 134.

Some of the Many Patterns of Wires Possible in This Invention (FIGS. 29 to 37)

A substantially infinite number of wire patterns are possible under this invention. The one shown heretofore with the wire 55 is a very good pattern, but it is not the only one that can be used. Patterns can be used for their structural features, because of manufacturing convenience, or because of design features. Some of these features will appear from the selected forms shown, and in all of them it will be seen that the wires, whether in parallel or alternate patterns, touch each other at least once per cycle; the touching may be flush to each other in the same plane or may be by an overlap of planes with the units still having substantially the same plane.

FIG. 29 shows a wire 211 with vinyl covering 212 and an adjacent wire 213 with vinyl covering 212 also on it. The wires 211 and 213 are bent in the same pattern but are set to alternate, so that one is rotated 180° relative to the other; instead of each wire 211 being strictly parallel to its adjacent wire 213, the sinuosities are reversed, and the alternating effect is obtained. Alternation can give some interesting designs, such as the one shown here. The length of the one cycle has been marked on the drawing, and it will be seen that the cycle is rather long, partly due to the alternation and partly due to the wire pattern itself. Thus the wire 211, starting from the left-hand end, has a long vertical portion 214, then a horizontal portion 215 succeeded by a short vertical portion 216, then a horizontal portion 217 preferably the same length as the portion 215. The portion 217 is followed by a portion 218, identical in length to the portion 216 and then leading to another portion 219, which is parallel to and in line with the portion 215 and is again of the same length. The portion 219 is followed by a portion 220 that is longer than the portions 216 and 218, and equal in length to the portion 214, therefore raising the wire 211 up to a new level. This is succeeded by a horizontal portion 221 of the same length as the portions 215 and 219 and parallel to them but displaced from them. This in turn is succeeded by a short portion 222, the same length as the portion 218 but starting from a different place so that the succeeding portion 223 is not in line with the portions 215 and 219, though parallel to them. Another portion 224 equal in length to the portion 222 is followed by the portion 225 in line with and equal in length to the portion 221, and this is followed in turn by a portion 214a identical to the portion 214 and beginning a new cycle.

The wire 213 adjacent to the wire 211 has the same pattern but is reversed, so that the wires 211 and 213 touch at the portions 215 and 219. The wires 211 and 213 touch or come close to the other wires to which they are adjacent to portions 221 and 225. These touching portions in this instance extend for the whole width, and the plastic coating 212 covers these portions as well as the individual wires.

FIG. 30 shows a wire 230 having a sinuous shape and an adjacent identical wire 231, both of them being covered by plastic 232. The length of one cycle is in this instance much shorter. The wire 230 has a flaring portion that describes what are nearly two circles 233 and 234, with their radii displaced, and these near circles 233 and 234 are joined by a smooth connecting curve 235. Again, the pattern is interesting, and the structural effects are substantially the same as what has already been described.

FIG. 31 shows a wire 240 which is made in a sinuous pattern not unlike the wire 55. The adjacent wires are overlapped, so that the wire 240 lies over a wire 241 and beneath a wire 242, and the plastic covering 243 joins all the wires. This pattern provides a small opening 244 through the overlaps and a large opening 245. This makes an interesting pattern, is another way of forming the assembly, and shows that the wires do not have to abut and lie in the identical plane.

FIG. 32 shows a wire 250 with an adjacent wire 251 and with plastic covering 252. Another type of square-wave pattern is shown giving a different pattern and again the length of cycle is shown.

FIG. 33 shows another form of pattern. In this case a wire 255 actually overlaps itself with a succession of circles so that no wire actually lies in a single plane, but there is, of course, substantially a planar configuration. The successive wires abut each other.

FIG. 34 shows another square-wave configuration with steps down and up with wires 260 and 261 etc., and plastic coating 262.

FIGS. 35 and 36 show an angular configuration and two different uses of the same wire 265 and coating 266. In FIG. 35 the adjacent wires are reversed to make big spaces in between, while in FIG. 36 the successive wires 265 are parallel to make trapezoids that are in each row alternately converted. The effects are different with the same wires. In addition, an additional wire 267 is used in FIG. 36; this wire 267 is of a different shape and curve length and is used for bounce-dampening, as is the wire 79 of FIG. 8.

FIG. 37 shows overlapped wire 270, 271 covered by a coating 272 which fastens the wires 270 and 271 together, with one wire 270 going under its adjacent wire 271, which in turn goes under its adjacent wire 273, and so on.

These are only examples of what can be done. Countless other patterns are possible.

Some Other Embodiments

Figure 38:
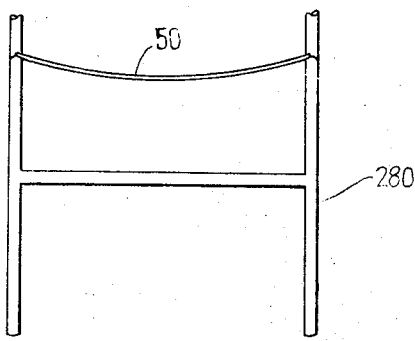
FIG. 38 is a view in front elevation of the lower portion of a modified form of chair embodying the principles of the invention.

FIG. 38 shows the lower portion of a chair 280 having an assembly 50 serving as a seat but inverted with respect to FIG. 1. While generally not preferable, this structure is quite usable. Here there is a simple trough shape.

Figure 39:
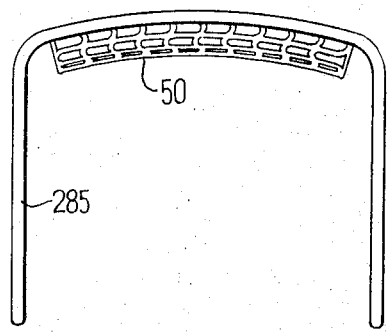
FIG. 39 is a view in side elevation of a stool embodying the principles of the invention in another modified form.

FIG. 39 shows a stool 285 having a spring seat made by an assembly 50 installed with double curvature, a concave arc bent into an upper or convex arc as seen from the side.

The thinness of the seats and backs of this invention is especially important. Thus the thickness of the coated wire—which is the seat or back thickness—should be between 1/200 and 1/50 of the cylindrical arc length of the assembly 50, i.e., of what is to be the span of the seat or back.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An assembly useful as a seating member or back member when installed on a frame, comprising:
    a series of arcuate, continuous, sinuous spring metal wires, each having two ends, each said wire closely approaching each of its immediately adjacent said wires at frequent intervals, and
    a thin sleevelike plastic coating surrounding said wires, following their sinuosity and joining them together where they closely approach each other, said approaches being close enough for effective bridging between them by said coating, said plastic coating having a Shore A durometer in the range of 45 to 90, the thickness of said coating being from about one-fifth of the wire thickness to about equal to the wire thickness,
    whereby said wires and plastic coating comprise a unitary assembly defining a cylindrical arc which is intended to be flattened somewhat when said assembly is installed on a said frame, thereby placing the springs in tension along a flatter cylindrical arc,
    said coating constituting the sole means holding said assembly together,
    said spring metal wires having a silhouette area of between about 17% and about 75% of the area of said assembly, the empty space between the coated wires occupying from about 2% to about 75% of the area of the assembly.

2. The assembly of claim 1 wherein said coating has a Shore A durometer of about 75.

3. The assembly of claim 1 having end border wires describing a circular arc identical to those of said spring metal wires and secured at intervals to the extreme said metal wires by said plastic coating.

4. The assembly of claim 3 wherein said border wires are undeviating along their arc.

5. The assembly of claim 3 wherein said border wire is itself sinuous but with a smaller amplitude of sinuousity than the spring metal wires.

6. The assembly of claim 1 wherein the ends of the wires are uncoated by said plastic coating.

7. The assembly of claim 1 wherein the ends of the wires lie in the same arc as the remainder of the wires.

8. The assembly of claim 1 wherein the ends of the wires are substantially perpendicular to the arc of the remainder of the wires.

9. The assembly of claim 1 wherein the ends of the wires lie closely adjacent the adjacent wires and the coating joins them together to provide a continuous rim portion.

10. The assembly of claim 1 wherein some of the wires are of different vibration frequency than others, thereby helping to dampen bounce.

11. The assembly of claim 10 wherein some of the wires are of different thickness from others.

12. The assembly of claim 10 wherein some of the wires are of different configuration and curve length from others.

13. The assembly of claim 10 wherein some of the wires are of different spring temper from others.

14. The assembly of claim 1 wherein the force required to pull apart the ends of said assembly for installation of said assembly upon the frame of a seating unit is between 340 and 680 pounds.

15. The assembly of claim 1 wherein the wire diameter is in the range of 0.05" to 0.15".

16. The assembly of claim 1 wherein the thickness of the coated wires is between 1/200 and 1/50 the length of said cylindrical arc.

17. The assembly of claim 1 wherein the close approaching of said wires comprises overlap of the successive wires, so that while all the wires lie substantially in substantially the same plane, they are actually in different planes at their overlaps.

References Cited

UNITED STATES PATENTS

| | | | |
|---|---|---|---|
| 2,803,293 | 8/1957 | Rowland | 297—445 |
| 3,082,438 | 3/1963 | Nachman Jr. | 5—353 |
| 2,244,469 | 6/1941 | Menge | 267—111 |
| 3,287,009 | 11/1966 | Greeno | 267—111 |
| 2,710,967 | 6/1955 | Bohm | 117—99 |

GEORGE F. LESMES, Primary Examiner

P. J. THIBODEAU, Assistant Examiner

U.S. Cl. X.R.

117—99, 128.4; 161—165; 297—452, 458